(12) United States Patent
Zhang et al.

(10) Patent No.: US 8,582,854 B2
(45) Date of Patent: Nov. 12, 2013

(54) METHOD AND SYSTEM FOR AUTOMATIC CORONARY ARTERY DETECTION

(75) Inventors: Lei Zhang, Troy, NY (US); Yefeng Zheng, Dayton, NJ (US); Bogdan Georgescu, Plainsboro, NJ (US); Fernando Vega-Higuera, Erlangen (DE); Dorin Comaniciu, Princeton Junction, NJ (US)

(73) Assignee: Siemens Aktiengesellschaft, Munich (DE)

(*) Notice: Subject to any disclaimer, the term of this patent is extended or adjusted under 35 U.S.C. 154(b) by 1142 days.

(21) Appl. No.: 12/487,121

(22) Filed: Jun. 18, 2009

(65) Prior Publication Data

US 2010/0067760 A1    Mar. 18, 2010

Related U.S. Application Data

(60) Provisional application No. 61/097,001, filed on Sep. 15, 2008.

(51) Int. Cl.
  *G06K 9/00* (2006.01)
(52) U.S. Cl.
  USPC ........................................................ 382/130

(58) Field of Classification Search
  None
  See application file for complete search history.

(56) References Cited

U.S. PATENT DOCUMENTS

| | | | |
|---|---|---|---|
| 4,692,864 A * | 9/1987 | Shimoni et al. | 600/443 |
| 5,872,861 A | 2/1999 | Makram-Ebeid | |
| 5,951,475 A * | 9/1999 | Gueziec et al. | 600/425 |
| 6,377,832 B1 | 4/2002 | Bergman et al. | |
| 6,408,201 B1 | 6/2002 | Foo et al. | |
| 6,741,880 B1 * | 5/2004 | Foo et al. | 600/419 |
| 7,291,111 B2 * | 11/2007 | Shertukde et al. | 600/483 |
| 8,290,228 B2 * | 10/2012 | Cohen et al. | 382/128 |
| 2005/0249391 A1 * | 11/2005 | Kimmel et al. | 382/128 |
| 2006/0050941 A1 | 3/2006 | Middleton et al. | |
| 2008/0101676 A1 * | 5/2008 | Zheng et al. | 382/131 |
| 2008/0213247 A1 * | 9/2008 | Plowman et al. | 424/130.1 |
| 2008/0273777 A1 * | 11/2008 | Luboz et al. | 382/130 |
| 2008/0304744 A1 * | 12/2008 | Peters et al. | 382/173 |

* cited by examiner

*Primary Examiner* — Nancy Bitar

(57) ABSTRACT

A method and system for coronary artery detection in 3D cardiac volumes is disclosed. The heart chambers are segmented in the cardiac volume, and an initial estimation of a coronary artery is generated based on the segmented heart chambers. The initial estimation of the coronary artery is then refined based on local information in the cardiac volume in order to detect the coronary artery in the cardiac volume. The detected coronary artery can be extended using 3D dynamic programming.

23 Claims, 4 Drawing Sheets

METHOD AND SYSTEM FOR AUTOMATIC CORONARY ARTERY DETECTION

This application claims the benefit of U.S. Provisional Application No. 61/097,001, filed Sep. 15, 2008, the disclosure of which is herein incorporated by reference.

BACKGROUND OF THE INVENTION

The present invention relates to medical imaging of the heart, and more particularly, to automatic detection of coronary arteries in medical images of the heart.

According to the statistics from the United States Center for Disease Control and Prevention, cardiovascular disease (CVD) is a leading cause of death in the United States. As reported by the American Heart Association, coronary artery disease (CAD) causes a largest percentage among various types of CVDs. CAD is often caused by the narrowing of the coronary artery or atherosclerosis. This can lead to coronary artery stenosis and can cause heart attacks, angina pectoris, or both.

Various techniques exist to produce images of the heart, including computed tomography (CT), magnetic resonance imaging (MRI), fluoroscopic imaging, etc. These techniques can be utilized to produce large amounts of 2D image and 3D volume data that can be used for analyzing the heart. Segmentation of coronary arteries in such heart images is an important step for detection of plaques, aneurysms, stenoses, and other abnormalities of coronary arteries that can result in dysfunction or disease of the heart. However, coronary artery segmentation or detection can be a difficult problem due to large variation in shape, low contrast, calcification, stenosis, occlusion, bifurcation, and the existence of other vessel-like structures, such as veins.

Typical conventional techniques for segmenting coronary arteries utilize a tracking based method that tracks the coronary arteries starting from a point on the aorta. Such conventional techniques typically require a human input as a seed, and are semi-automatic approaches that may not be fast enough for clinical application. Furthermore, such conventional techniques are sensitive to artifacts, and a mistake caused by an artifact can lead to tracking of an entirely wrong path.

BRIEF SUMMARY OF THE INVENTION

The present invention provides a method and system for automatic detection of coronary arteries in medical imaging data. Embodiments of the present invention utilize advanced machine learning to learn a robust model for automatic coronary artery detection. According to embodiments of the present invention, once a coronary artery detection model is trained, it can be used to efficiently and robustly detect coronary arteries in a patient's cardiac image data.

In one embodiment of the present invention, the heart chambers are segmented in the cardiac volume, and an initial estimation of a coronary artery is generated based on the segmented heart chambers. The initial estimation can be generated by applying a transformation of the heart to a mean shape model of the coronary artery that is learned from training data. The initial estimation of the coronary artery is then refined based on local information in the cardiac volume in order to detect the coronary artery in the cardiac volume. The initial estimation is refined by refining control points of the coronary artery using a coronary artery detector trained based on training data. The detected coronary artery can be extended using 3D dynamic programming.

These and other advantages of the invention will be apparent to those of ordinary skill in the art by reference to the following detailed description and the accompanying drawings.

DETAILED DESCRIPTION

The present invention is directed to a method and system for automatic detection of coronary arteries in medical image data. Embodiments of the present invention are described herein to give a visual understanding of the coronary artery detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention can be used to automatically detect coronary arteries in 3D medical imaging data, such as computed tomography (CT) data, magnetic resonance imaging (MRI) data, fluoroscopic images, etc. In order to automatically detect coronary arteries in a 3D volume, embodiments of the present invention apply a rigid and/or non-rigid transformation to a mean shape model of the coronary artery that is learned from training data. These transformations deform the mean shape and produce an initial estimation of the coronary artery. This initial coronary artery is then locally refined using a probabilistic boosting tree (PBT) classifier. Dynamic programming is then used to grow the coronary artery to its end point. Embodiments of the present invention can be utilized for fully automatic detection of the coronary arteries in 3D medical imaging data.

Figure 1:
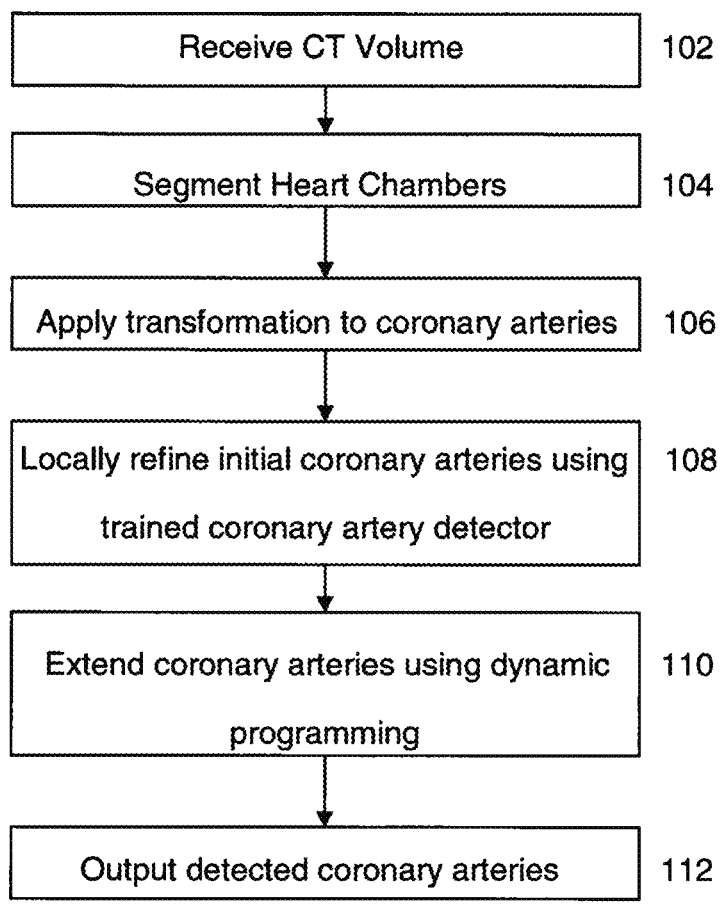
FIG. 1 illustrates a method for automatically detecting coronary arteries in a in a 3D medical image volume according to an embodiment of the present invention.

FIG. 1 illustrates a method for automatically detecting coronary arteries in a in a 3D medical image volume according to an embodiment of the present invention. The method of FIG. 1 transforms image data representing a patient's heart into data that indicates the location of the coronary artery in the patient's heart. The method of FIG. 1 is described herein as detecting coronary arteries in a 3D cardiac CT volume. It is to be understood that the present invention is not limited thereto, and can be similarly applied to other medical image data, such as MRI data, fluoroscopic images, etc. According to an advantageous embodiment of the present invention, the method of FIG. 1 can be used to detect the entire coronary artery tree. As shown herein, the method of FIG. 1 is demonstrated on the four main coronary artery trunks: Left Main (LM), Left Anterior Descending (LAD), Left Circumflex (LCX), and Right Coronary Artery (RCA).

Referring to FIG. 1, at step 102, a 3D cardiac volume is received. The cardiac volume can be received from an image acquisition device, such as a CT scanning device, or can be a previously stored volume loaded from memory or storage of a computer system, or some other computer readable medium.

At step 104, the chambers of the heart are segmented. The chambers of the heart (LV, right ventricle (RV), left atrium (LA), and right atrium (RA)) can be segmented by generating a model, such as a surface mesh, of the heart chambers using marginal space learning (MSL). Such a model fitting approach can be based on exploiting a large database of annotated CT volumes to learn discriminative object models. This segmentation, or model fitting, can be formulated as a two-step learning problem: anatomical structure localization and boundary delineation. Such a method for MSL-based heart chamber segmentation is described in detail in U.S. Publication No. 2008/0101676, which is incorporated herein by reference.

Object localization is required for automatic segmentation, and discriminative learning approaches are efficient and robust for solving 2D object localization problems. MSL and steerable features are used to extend a learning based approach to 3D object detection. The idea of MSL is not to learn a classifier directly in a full similarity transformation parameter space, but to incrementally learn classifiers on projected sample distributions. As the dimensionality increases, the valid (positive) space region becomes more restricted by previous marginal space classifiers.

Since the coronary arteries are attached to the heart chamber surfaces, the relative position of the coronary arteries with respect to the hear chambers can give a rough initial estimation of the coronary arteries. The annotated CT training volumes used for training the MSL classifiers can be annotated with both the heart chambers and the coronary arteries. In each of these training volumes, in addition to the heart chambers, the centerlines of the four main coronary artery trunks, i.e., Left Main (LM), Left Anterior Descending (LAD), Left Circumflex (LCX), and Right Coronary Artery (RCA), are annotated. The LM in each training volume can be represented with eight uniformly distributed control points, and the LAD, LCX, and RCA each can be represented with 64 uniformly distributed control points. Using these annotated training volumes, it is possible to calculate a mean shape of the heart including the heart chambers and the coronary arteries. For example, a mean heart mesh (model) can be calculated from the annotated meshes in the training volumes using Procrustes analysis. As described above, MSL can be used to estimate the heart pose (i.e., location, orientation, and scale) efficiently from the input volume. The mean heart mesh is then aligned with the estimated heart pose in the input image to generate an initial heart mesh. In particular, after estimating the position, orientation, and scale of the heart, a rigid transformation can be applied to the mean heart model to align it with respect to the input 3D volume. Learning based detectors are then exploited to deform the initial hear chamber mesh to better fit the chamber boundaries in the input image. This results in a segmented heart chamber model that includes coronary arteries.

At step 106, a transformation is applied to the coronary arteries in the segmented heart chamber model to register the coronary arteries to the input 3D volume. In order to register the coronary arteries to the 3D volume, the deformation field that warps the mean chamber mesh to the patient specific segmented heart chamber mesh is estimated. According to an advantageous implementation, a thin-plate spline (TPS) can be used to model the non-rigid deformation field. Since the coronary arteries are attached to the surface of the heart chambers, applying the estimated TPS deformation to the coronary arteries results a better initialization of the coronary arteries in the 3D volume. Accordingly, this step results in an initial estimate of each of the control points of the coronary arteries.

At step 108, the initial coronary arteries are locally refined using a trained coronary artery detector. The global non-rigid transformation applied to the coronary arteries of the segmented heart chamber model in step 106 can be seen as a global constraint on the coronary arteries with respect to the heart. Although, this non-rigid transformation roughly estimates the position coronary arteries, step 106 does not exploit local information to decide whether a point belongs to a coronary artery or not. In order to use such local information, a coronary artery detector that can estimate the probability of a point (voxel) to be part of a coronary artery can be trained based on local features. The coronary artery detector can be trained based on annotated training data using advanced machine learning techniques, such as a probabilistic boosting tree (PBT). The local features can be scale and shift invariant steerable features that are calculated from a centered small volume around the target point. The PBT boosts the performance of weak classifiers to generate a strong tree-structure classifier.

Figure 2:
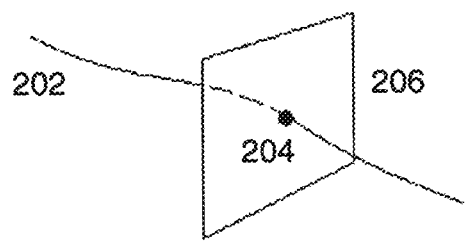
FIG. 2 illustrates a plane normal to the tangent direction of the coronary artery at a control point.

The trained PBT classifier is used to estimate the probability of a point to be part of the coronary artery based on the local features. Given the roughly estimated coronary artery control point positions from step 106, the trained coronary artery detector is used to search for a point with the maximum probability within a place normal to the tangent direction of the coronary artery at each control point. FIG. 2 illustrates the plane normal to the tangent direction of the coronary artery at a control point. As illustrated in FIG. 2, coronary artery centerline 202 is defined by the estimated control points. At control point 204, plane 206 is normal to the tangent direction of the coronary artery centerline 202. The trained coronary artery detector searches within the plane for an optimal point having the highest probability. The control point is then replaced with the optimal point detected in the plane. This step can refine the position of each control point based on the local information around the control point. If a set of points $V=\{V_1, V_2, \ldots, V_N\}$ represents the sampled control points in a coronary artery, this refinement step searches for an adjusted set of control points $V_1', V_2', \ldots, V_N'$ such that:

$$V_1', V_2', \ldots, V_N' = \arg\max_V \prod_{i=1}^{N} P(V_i). \quad (1)$$

After the control points of the coronary artery are refined, the coronary artery centerlines defined by the control points can be smoothed. In order to make the refined coronary artery smooth, it can be projected in the subspace of the principle components that are also obtained during the training process. There are two purposes for the subspace projection, one for smoothing and the other for enforcing statistical shape constraint. Given a set of training data, it is possible to train a statistical shape model which describes the possible deformation of the shape. During detection, the detected shape is constrained to make it similar to the training shapes. This results in a refined smooth coronary artery that is detected using both global information and local information in the input 3D volume. As used herein, global information refers to the global geometric relationship of the heart chambers and the coronary arteries. This information is used by non-rigid alignment of the coronary arteries with respect to the segmented heart chambers. The local information refers to the local intensity characteristics of a small block around a control point of the coronary centerline. The learning based coronary detector can use this local information to move each control point to the optimal position inside the normal plane. Since the initial estimation of the coronary artery may be far from the actual position, this refinement process may be iterated until it converges.

At step 110, the coronary arteries are tracked using dynamic programming. In the detected coronary arteries resulting from step 108, some errors may remain due to outliers that never appear in or are significantly different from the training data. In addition, a detected coronary artery may not reach its full length since the mean shape calculated from the training data may only be a partial coronary artery. 3D dynamic programming (DP) can be used to address these minor issues. DP can find a minimum cost path from a starting point (e.g., the end of a partially detected coronary artery) to an ending point (e.g., the extreme point of the full length of the coronary artery).

DP is a problem to find a minimum cost path between the given starting point S and an ending point E. In the 3D space, a path between S and E is represented as a set of ordered points $P=[V_S, V_1, V_2, \ldots, V_K, V_E]$. The minimum cost path searching is modeled as an optimization problem to find the optimal path:

$$P^* = \arg\min_P \cos t(V_S) + \sum_{i=1}^{K} \cos t(V_i) + \cos t(V_E), \quad (2)$$

where $\cos t(\cdot)$ is a selected cost function associated with each point. According to a possible implementation, such a cost function can be defined as a decreasing function of the response of the vessel filter. Accordingly, DP can be used, starting at an endpoint of each detected coronary artery, to detect any portion of the coronary artery extending past that end point. In DP, two end points need to be specified. However, in our case, we only have one end point, which is the end point of the coronary artery generated by step 108. According to an advantageous implementation, DP is used to calculate the optimal path from this end point to all other points in a surrounding block. Each path has a length measurement and a cost. The best path is selected based on the weighted combination of the length and cost. For example, a long path with a small cost can be selected as the best path.

At step 112, the coronary artery detection results are output. For example the coronary artery detection results can be output by displaying the detected coronary arteries on a display of a computer system, or other display device. It is also possible that the coronary artery detection results can be output by storing the detected coronary arteries, for example, on a storage or memory of a computer system or on a computer readable medium. The output coronary artery detection results can also be used for additional processing of the input 3D volume. For example, the detected coronary arteries can be used in a method for detecting coronary stenosis in the input 3D volume.

Figure 3:
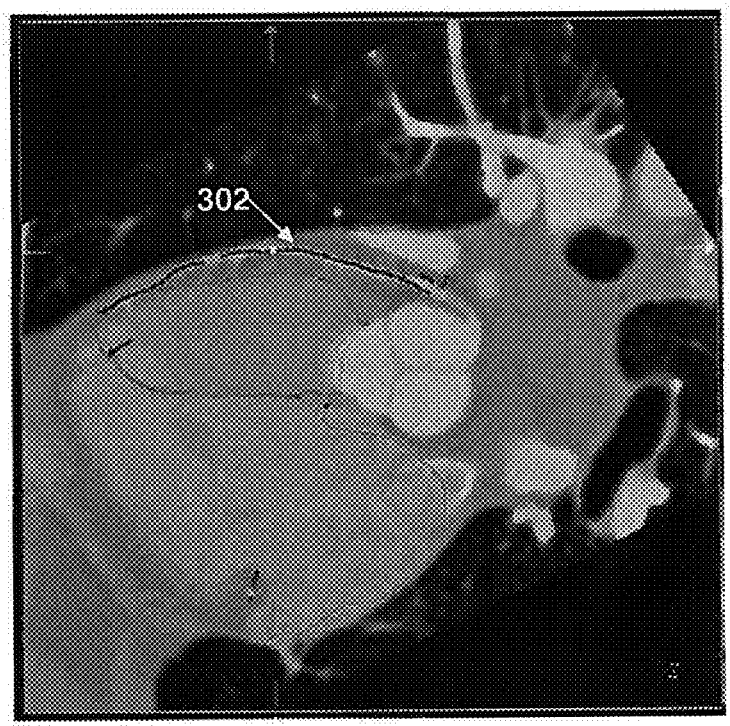
FIG. 3 illustrates a Left Anterior Descending (LAD) coronary artery detected in an exemplary CT volume using the method of FIG. 1.
Figure 4:
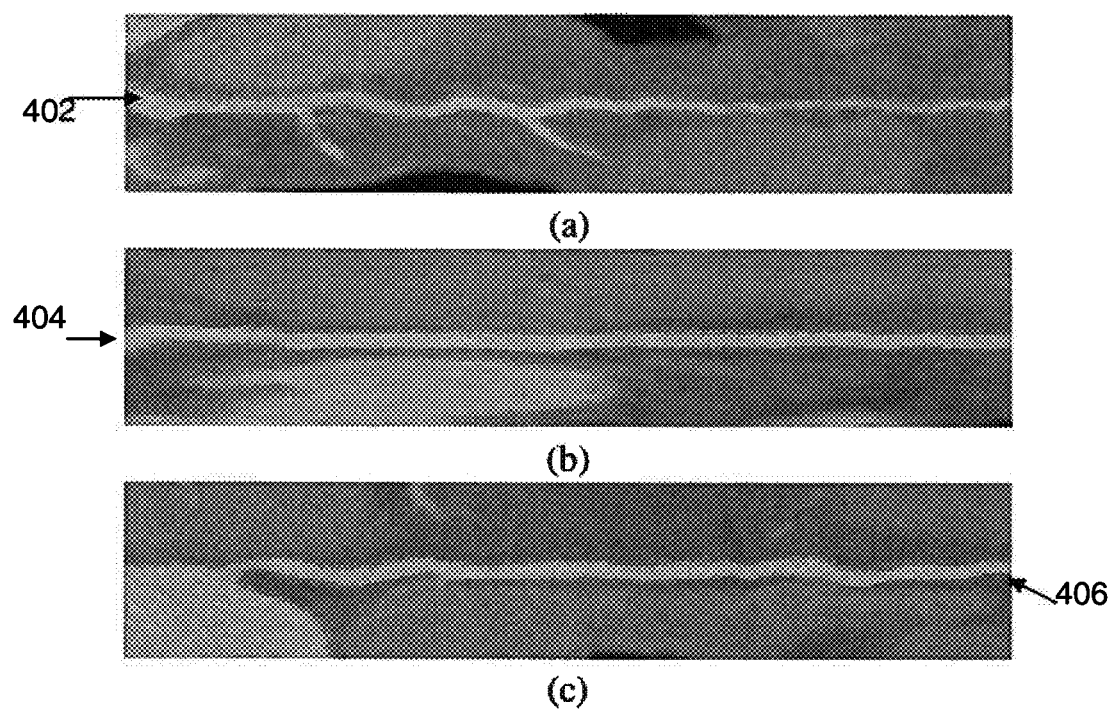
FIG. 4 illustrates curved multi-planar reconstruction (MPR) images showing major coronary arteries detected in an exemplary CT volume using the method of FIG. 1.

FIGS. 3 and 4 illustrate exemplary coronary artery detection results using the method of FIG. 1. FIG. 3 shows a Left Anterior Descending (LAD) coronary artery 302 detected in an exemplary CT volume using the method of FIG. 1. FIG. 4 shows curved multi-planar reconstruction (MPR) images showing major coronary arteries detected in an exemplary CT volume using the method of FIG. 1. Image (a) of FIG. 4 is an MPR showing a detected LAD coronary artery 402. Image (b) of FIG. 4 is an MPR showing a detected Left Circumflex (LCX) coronary artery 404. Image (c) of FIG. 4 is an MPR showing a detected Right Coronary Artery (RCA) 406.

Figure 5:
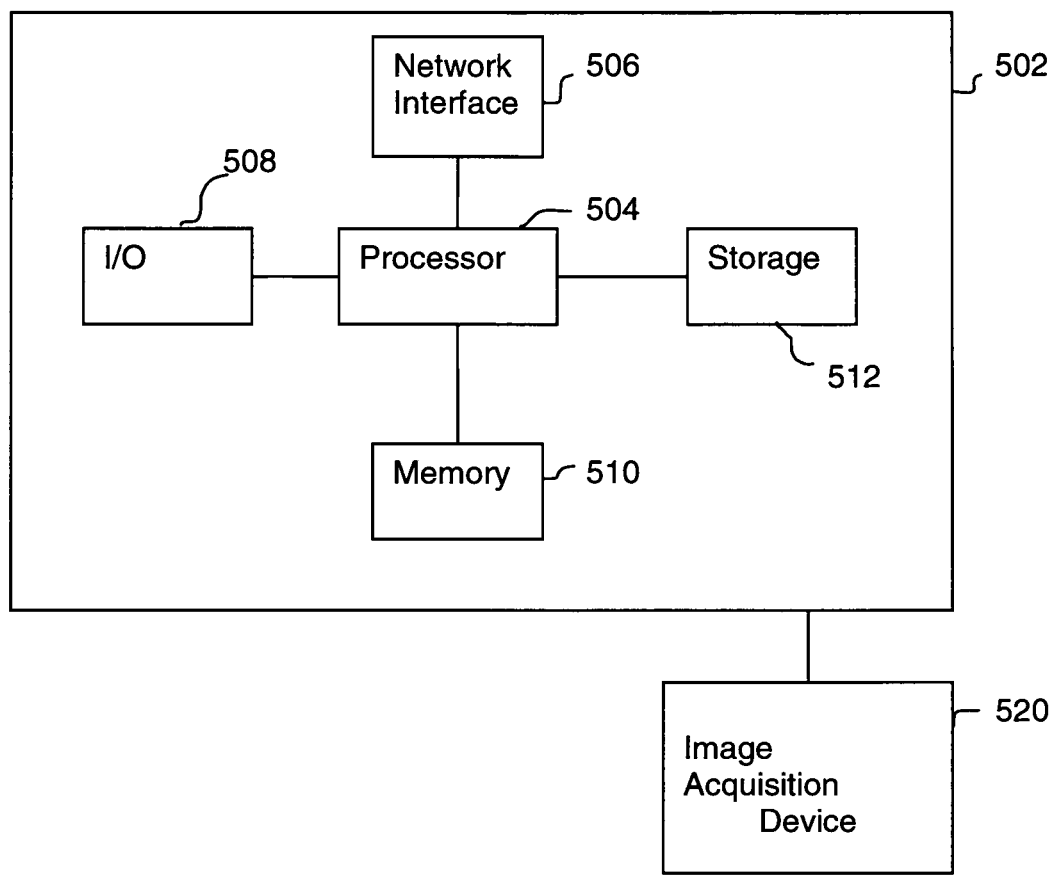
FIG. 5 is a high level block diagram of a computer capable of implementing the present invention.

The above-described methods for coronary artery detection in an input 3D volume may be implemented on a computer using well-known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.) and loaded into memory 510 when execution of the computer program instructions is desired. Thus, the steps of the method of FIG. 1 may be defined by the computer program instructions stored in the memory 510 and/or storage 512 and controlled by the processor 504 executing the computer program instructions. An image acquisition device 520, such as a CT scanning device, can be connected to the computer 502 to input the 3D volumes to the computer 502. It is possible to implement the image acquisition device 520 and the computer 502 as one device. It is also possible that the image acquisition device 520 and the computer 502 communicate wirelessly through a network. The computer 502 also includes one or more network interfaces 506 for communicating with other devices via a network. The computer 502 also includes other input/output devices 508 that enable user interaction with the computer 502 (e.g., display, keyboard, mouse, speakers, buttons, etc.). Such input/output devices 508 may be used in conjunction with a set of computer programs as an annotation tool to annotate volumes received from the image acquisition device 520. One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for coronary artery detection in a 3D cardiac volume, comprising:
    segmenting at least one heart chamber in said volume;
    generating an initial estimation of a coronary artery in said volume based on the segmented at least one heart chamber,
    the initial estimation of the coronary artery comprising a plurality of control points defining the coronary artery; and detecting the coronary artery in said 3D cardiac volume by refining each of the control points in the initial estimation of the coronary artery based on local information to each of the control points in said volume; wherein said step of detecting the coronary artery in said 3D cardiac volume comprises: (a) detecting an optimal point within a neighborhood of each control point having a highest probability using a trained coronary artery detector; and (b) replacing each control point with the detected optimal point in the neighborhood of that control point.

2. The method of claim 1, further comprising:
growing the detected coronary artery using 3D dynamic programming.

3. The method of claim 1, wherein said step of segmenting at least one heart chamber comprises:
estimating a location, orientation, and scale of the heart in said volume using marginal space learning (MSL);
aligning a mean heart model to said volume based on the estimated location, orientation, and scale, said mean heart model including at least one coronary artery; and
generating a segmented heart model by deforming the mean heart model using learning based chamber boundary detectors to fit heart chamber boundaries in said volume.

4. The method of claim 3, wherein said step of generating an initial estimation of a coronary artery in said volume based on the segmented at least one heart chamber comprises:
estimating a deformation field that warps the mean heart model to the segmented heart model; and
applying the estimated deformation field to the at least one coronary artery in the segmented heart model to generate the initial estimation of the coronary artery in said volume.

5. The method of claim 4, wherein:
said step of estimating a deformation field comprises modeling the deformation field using a thin-plate spline (TPS); and
said step of applying the estimated deformation field to the at least one coronary artery in the segmented heart model comprises applying the TPS to the at least one coronary artery in the segmented heart model.

6. The method of claim 1, wherein said step of generating an initial estimation of a coronary artery in said volume based on the segmented at least one heart chamber comprises:
applying at least one of a rigid transformation and a non-rigid transformation to a mean shape model of the coronary artery in said volume to deform the mean shape model of the coronary artery to generate the initial estimation of the coronary artery.

7. The method of claim 1, wherein said trained coronary artery detector is trained based on annotated training data using a probabilistic boosting tree and local scale and shift invariant steerable features.

8. The method of claim 1, wherein step (a) comprises: for each control point, locally searching for the point with maximum probability within a plane normal to a tangent direction of the coronary artery at the control point.

9. The method of claim 1, wherein said step of detecting the coronary artery in said 3D cardiac volume by refining each of the control points in the initial estimation of the coronary artery based on local information to each of the control points in said volume further comprises: (c) smoothing the coronary artery defined by the refined control points.

10. The method of claim 9, wherein said step of detecting the coronary artery in said 3D cardiac volume by refining each of the control points in the initial estimation of the coronary artery based on local information to each of the control points in said volume further comprises:
repeating steps (a), (b), and (c) until each control point converges.

11. An apparatus for coronary artery detection in a 3D cardiac volume, comprising: means for segmenting at least one heart chamber in said volume; means for generating an initial estimation of a coronary artery in said volume based on the segmented at least one heart chamber, the initial estimation of the coronary artery comprising a plurality of control points defining the coronary artery; and means for detecting the coronary artery in said 3D cardiac volume by refining each of the control points in the initial estimation of the coronary artery based on local information to each of the control points in said volume; wherein said means for detecting the coronary artery comprises: means for detecting an optimal point within a neighborhood of each control point having a highest probability using a trained coronary artery detector; and means for replacing each control point with the detected optimal point in the neighborhood of that control point.

12. The apparatus of claim 11, further comprising:
means for growing the detected coronary artery using 3D dynamic programming.

13. The apparatus of claim 11, wherein said means for segmenting at least one heart chamber comprises:
means for estimating a location, orientation, and scale of the heart in said volume using marginal space learning (MSL);
means for aligning a mean heart model to said volume based on the estimated location, orientation, and scale, said mean heart model including at least one coronary artery; and
means for generating a segmented heart model by deforming the mean heart model using learning based chamber boundary detectors to fit heart chamber boundaries in said volume.

14. The apparatus of claim 13, wherein said means for generating an initial estimation of a coronary artery in said volume based on the segmented at least one heart chamber comprises:
means for estimating a deformation field that warps the mean heart model to the segmented heart model; and
means for applying the estimated deformation field to the at least one coronary artery in the segmented heart model to generate the initial estimation of the coronary artery in said volume.

15. The apparatus of claim 11, wherein said trained coronary artery detector is trained based on annotated training data using a probabilistic boosting tree and local scale and shift invariant steerable features.

16. The apparatus of claim 11, wherein said means for detecting the coronary artery in said 3D cardiac volume by refining each of the control points in the initial estimation of the coronary artery based on local information to each of the control points in said volume further comprises: means for smoothing the coronary artery defined by the refined control points.

17. A non-transitory computer readable medium encoded with computer executable instructions for coronary artery detection in a 3D cardiac volume, the computer executable instructions defining steps comprising: segmenting at least one heart chamber in said volume; generating an initial estimation of a coronary artery in said volume based on the segmented at least one heart chamber, the initial estimation of the coronary artery comprising a plurality of control points defining the coronary artery; and detecting the coronary artery in said 3D cardiac volume by refining each of the control points in the initial estimation of the coronary artery based on local information to each of the control points in said volume; wherein detecting the coronary artery in said 3D cardiac volume comprise computer executable instructions defining the steps of: (a) detecting an optimal point within a neighborhood of each control point having a highest probability using a trained coronary artery detector; and (b) replacing each control point with the detected optimal point in the neighborhood of that control point.

18. The non-transitory computer readable medium of claim 17, further comprising computer executable instructions defining the step of:
growing the detected coronary artery using 3D dynamic programming.

19. The non-transitory computer readable medium of claim 17, wherein the computer executable instructions defining the step of segmenting at least one heart chamber comprise computer executable instructions defining the steps of:
estimating a location, orientation, and scale of the heart in said volume using marginal space learning (MSL);
aligning a mean heart model to said volume based on the estimated location, orientation, and scale, said mean heart model including at least one coronary artery; and
generating a segmented heart model by deforming the mean heart model using learning based chamber boundary detectors to fit heart chamber boundaries in said volume.

20. The non-transitory computer readable medium of claim 19, wherein the computer executable instructions defining the step of generating an initial estimation of a coronary artery in said volume based on the segmented at least one heart chamber comprise computer executable instructions defining the steps of:
estimating a deformation field that warps the mean heart model to the segmented heart model; and
applying the estimated deformation field to the at least one coronary artery in the segmented heart model to generate the initial estimation of the coronary artery in said volume.

21. The non-transitory computer readable medium of claim 17, wherein said trained coronary artery detector is trained based on annotated training data using a probabilistic boosting tree and local scale and shift invariant steerable features.

22. The non-transitory computer readable medium of claim 17, wherein the computer executable instructions defining the step of detecting the coronary artery in said 3D cardiac volume by refining each of the control points in the initial estimation of the coronary artery based on local information to each of the control points in said volume further comprise computer executable instructions defining the step of: (c) smoothing the coronary artery defined by the refined control points.

23. The non-transitory computer readable medium of claim 22, wherein the computer executable instructions defining the step of detecting the coronary artery in said 3D cardiac volume by refining each of the control points in the initial estimation of the coronary artery based on local information to each of the control points in said volume further comprise computer executable instructions defining the step of:
repeating steps (a), (b), and (c) until each control point converges.

* * * * *